United States Patent
Lee

(10) Patent No.: US 8,390,755 B2
(45) Date of Patent: Mar. 5, 2013

(54) LIQUID CRYSTAL DISPLAY DEVICE

(75) Inventor: Jae-Ho Lee, Gumi Si (KR)

(73) Assignee: LG Display Co., Ltd., Seoul (KR)

( * ) Notice: Subject to any disclaimer, the term of this patent is extended or adjusted under 35 U.S.C. 154(b) by 871 days.

(21) Appl. No.: 12/329,280

(22) Filed: Dec. 5, 2008

(65) Prior Publication Data

US 2009/0207335 A1    Aug. 20, 2009

(30) Foreign Application Priority Data

Feb. 14, 2008    (KR) .................. 10-2008-0013654

(51) Int. Cl.
*G02F 1/1333*    (2006.01)

(52) U.S. Cl. .............. 349/58; 349/61; 349/64; 362/600; 362/235; 362/97.1; 348/740; 348/E05.134

(58) Field of Classification Search .................... 349/58; 362/600, 235, 97.1; 348/740, E05.134
See application file for complete search history.

(56) References Cited

U.S. PATENT DOCUMENTS

| | | | |
|---|---|---|---|
| 6,669,149 B2* | 12/2003 | Akizuki .......................... 248/71 |
| 7,207,710 B2* | 4/2007 | Kim .............................. 362/634 |
| 2006/0039163 A1* | 2/2006 | Yun ............................... 362/600 |
| 2007/0053171 A1* | 3/2007 | Park .................................. 362/29 |
| 2007/0058397 A1* | 3/2007 | Aoki et al. ..................... 362/655 |
| 2007/0091589 A1* | 4/2007 | Choi et al. ...................... 362/97 |
| 2007/0153154 A1* | 7/2007 | Lee et al. ......................... 349/58 |

* cited by examiner

*Primary Examiner* — Edward Glick
*Assistant Examiner* — Sang Nguyen
(74) *Attorney, Agent, or Firm* — Birch, Stewart, Kolasch & Birch, LLP

(57) ABSTRACT

A liquid crystal display (LCD) device comprises: an LC panel; a light source for supplying light to the LC panel; an optical sheet for converting light from the light source and supplying the converted light to the LC panel; an optical sheet supporting unit including a bar-shaped body portion, a supporting portion upwardly protruding from the body portion and supporting the optical sheet, a first fixing portion downwardly protruding from the body portion, formed in a single bending process, and having a first stopper at the end thereof, and a second stopper downwardly protruding from the body portion; and a lower cover having a first coupling hole to couple a part of the first fixing portion and the second stopper, and having a second coupling hole to couple the first stopper of the first fixing portion, for accommodating the light source and the optical sheet supporting unit therein.

7 Claims, 6 Drawing Sheets

LIQUID CRYSTAL DISPLAY DEVICE

RELATED APPLICATION

The present invention relates to subject matter contained in priority Korean Application 10-2008-0013654, filed Feb. 14, 2008, which is herein expressly incorporated by reference in its entirety.

BACKGROUND OF THE INVENTION

1. Field of the Invention

The present invention relates to a liquid crystal display (LCD) device, and more particularly, to an LCD device having an optical sheet supporting means that is prevented from being detached from a lower cover due to an external force.

2. Description of the Background Art

Generally, a liquid crystal display (LCD) device is being widely used due to advantages such as a light weight, a thin thickness, and low power consumption. Accordingly, the LCD device is being widely used to display images on screens of a portable computer, a portable phone, and office automation equipment.

The LCD device displays desired images on a screen by controlling optical transmittance according to image signals applied to a plurality of controlling switching devices arranged in a matrix format.

The LCD device comprises an upper substrate, a color filter substrate facing a lower substrate, a thin film transistor (TFT) array substrate; an LC panel including an LC layer sandwiched by the upper and lower substrates; and a driving portion for driving the LC panel by supplying scan signals and image information to the LC panel.

Since the LCD device does not spontaneously emit light, it is provided with a light source to supply light to the LC panel. Accordingly, the LCD device is provided with a backlight assembly including a light source to supply light to the LC panel, a light guide plate for converting light emitted from the light source into white light which is uniformly planarized, an optical sheet, etc.

The optical source of the backlight assembly includes a cold cathode fluorescent lamp (CCFL), an external electrode fluorescent lamp (EEFL), a light emitting diode (LED)), etc.

Hereinafter, the conventional LCD device will be explained in more detail with reference to the attached drawings.

As shown in FIG. 1, the conventional LCD device comprises an LC panel 1, a plurality of lamps 2 for supplying light to the LC panel 1, an optical sheet 3 for converting light emitted from the lamps 2 and supplying the converted light to the LC panel 1, a reflection sheet 6 for reflecting light emitted from the lamps 2 to toward the LC panel 1, and a lower cover 5 having the plurality of lamps 2 accommodated therein. The optical sheet 103 is composed of a plurality of sheets such as a diffusion sheet, a prism sheet, and a protection sheet.

As the LCD device becomes larger, the lamps 2 to supply light to the LC panel, and the optical sheet 3 for converting light emitted from the lamps 2 also become larger. Here, the optical sheet 3 having an increased size may downwardly deform due to its weight, thereby deteriorating a picture quality of images displayed on the LC panel 1. To solve these problems, an LCD device having an optical sheet supporting means has been proposed.

Referring to FIG. 2, the conventional LCD device having an optical sheet supporting means 14 for preventing the optical sheet 13 from being downwardly deformed will be explained.

As shown in FIG. 2, the optical sheet supporting means 14 includes a bar-shaped body portion 14a; a supporting portion 14b upwardly protruding from the body portion 14a with a conical shape, and contacting a lowest surface of the optical sheet 13; a first fixing portion 14c downwardly protruding from the body portion 14a, formed in a single bending process, and having a stopper 14c1 at the end thereof; and a second stopper fixing portion 14e downwardly protruding from the body portion 14a, and formed in a single bending process. The optical sheet supporting means 14 is fixed in the lower cover 15.

A plurality of coupling holes 15a, 15b, and 15c for fixing the optical sheet supporting means 14 are formed at the lower cover 15. More specifically, the first coupling hole 15a couples a part of the first fixing portion 14c of the optical sheet supporting means 14, the second coupling hole 15b couples the stopper 14c1 of the first fixing portion 14c, and the third coupling hole 15c couples the second fixing portion 14e. In the case that a reflection sheet 16 is provided in the lower cover 15, fourth to sixth coupling holes 16a to 16c corresponding to the first to third coupling holes 15a to 15c of the lower cover 15 are formed at the reflection sheet 16.

Firstly, the first fixing portion 14c is entirely coupled to the first coupling hole 15a of the lower cover 15 and the fourth coupling hole 16a of the reflection sheet 16, and the second fixing portion 14e is entirely coupled to the third coupling hole 15c of the lower cover 15 and the sixth coupling hole 16c of the reflection sheet 16. Then, the optical sheet supporting means 14 is made to be slid in a direction indicated by the arrow in FIG. 2. As a result, the stopper 14c1 of the first fixing portion 14c is coupled to the second coupling hole 15b of the lower cover 15 and the fifth coupling hole 16b of the reflection sheet 16, thereby completing the coupling of the optical sheet supporting means 14 to the lower cover 15 and the reflection sheet 16.

In the conventional LCD device, as shown in FIG. 3, the optical sheet supporting means 14 may be detached from the lower cover 15 when an external force (F) is applied thereto due to the following reasons. Since the optical sheet supporting means 14 is fixed only at the stopper 14c1 of the first fixing portion 14c in the right direction of FIG. 3, the stopper 14c1 of the first fixing portion 14c can be easily detached from the second coupling hole 15b of the lower cover 15 by the external force (F) applied to the right direction of FIG. 3.

SUMMARY OF THE INVENTION

Therefore, it is an object of the present invention to provide an LCD device having an optical sheet supporting means that is prevented from being detached from a lower cover due to an external force.

To achieve these and other advantages and in accordance with the purpose of the present invention, as embodied and broadly described herein, there is provided a liquid crystal display (LCD) device, comprising: an LC panel, a light source for supplying light to the LC panel; an optical sheet for converting light from the light source and supplying the converted light to the LC panel; an optical sheet supporting means including a bar-shaped body portion, a supporting portion upwardly protruding from the body portion and supporting the optical sheet, a first fixing portion downwardly protruding from the body portion, formed in a single bending process, and having a first stopper at the end thereof, and a second stopper downwardly protruding from the body portion; and a lower cover having a first coupling hole to couple a part of the first fixing portion and the second stopper, and having a second coupling hole to couple the first stopper of the first fixing portion, for accommodating the light source and the optical sheet supporting means therein.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

Hereinafter, a liquid crystal display (LCD) device according to the present invention will be explained in more detail with reference to the attached drawings.

Figure 1:
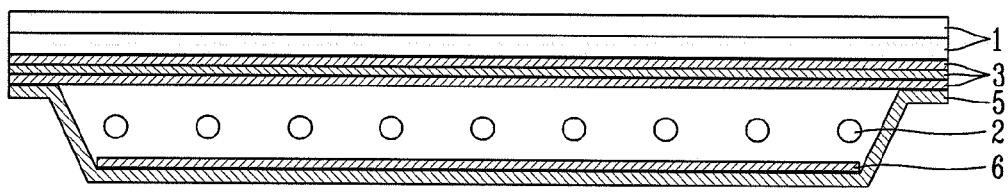
FIG. 1 is a sectional view showing one example of a liquid crystal display (LCD) device in accordance with the conventional art.
Figure 2:
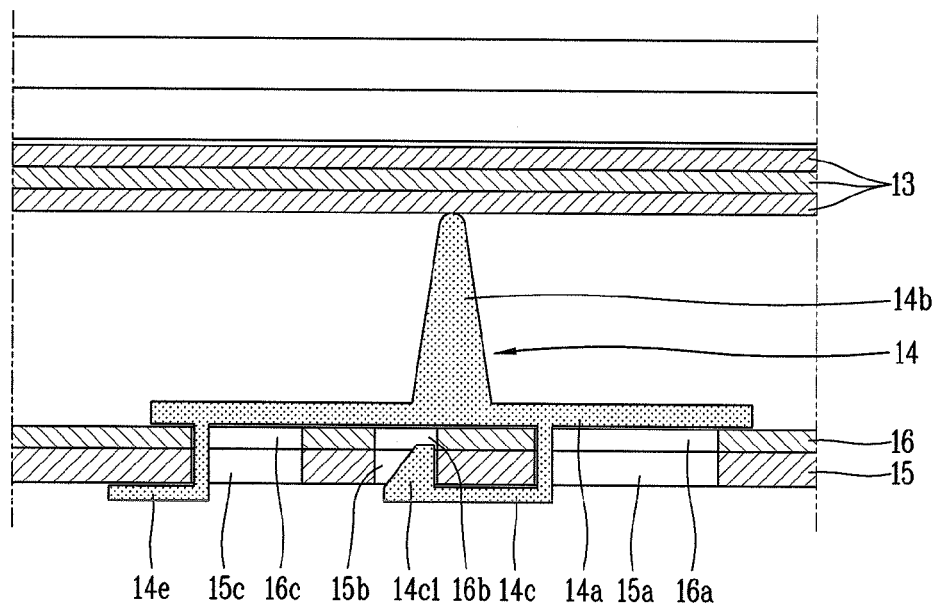
FIG. 2 is a sectional view showing another example of a liquid crystal display (LCD) device in accordance with the conventional art.
Figure 3:
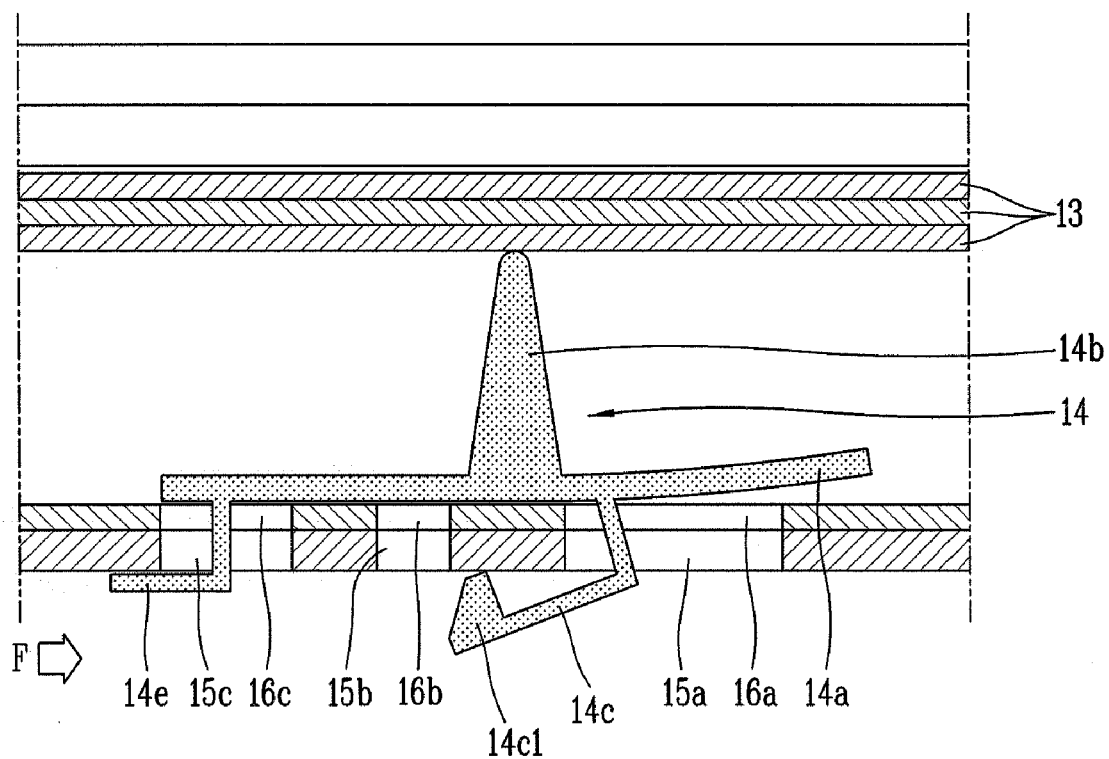
FIG. 3 is a sectional view showing a state that an optical sheet supporting means is detached from the LCD device due to an external force.
Figure 4:
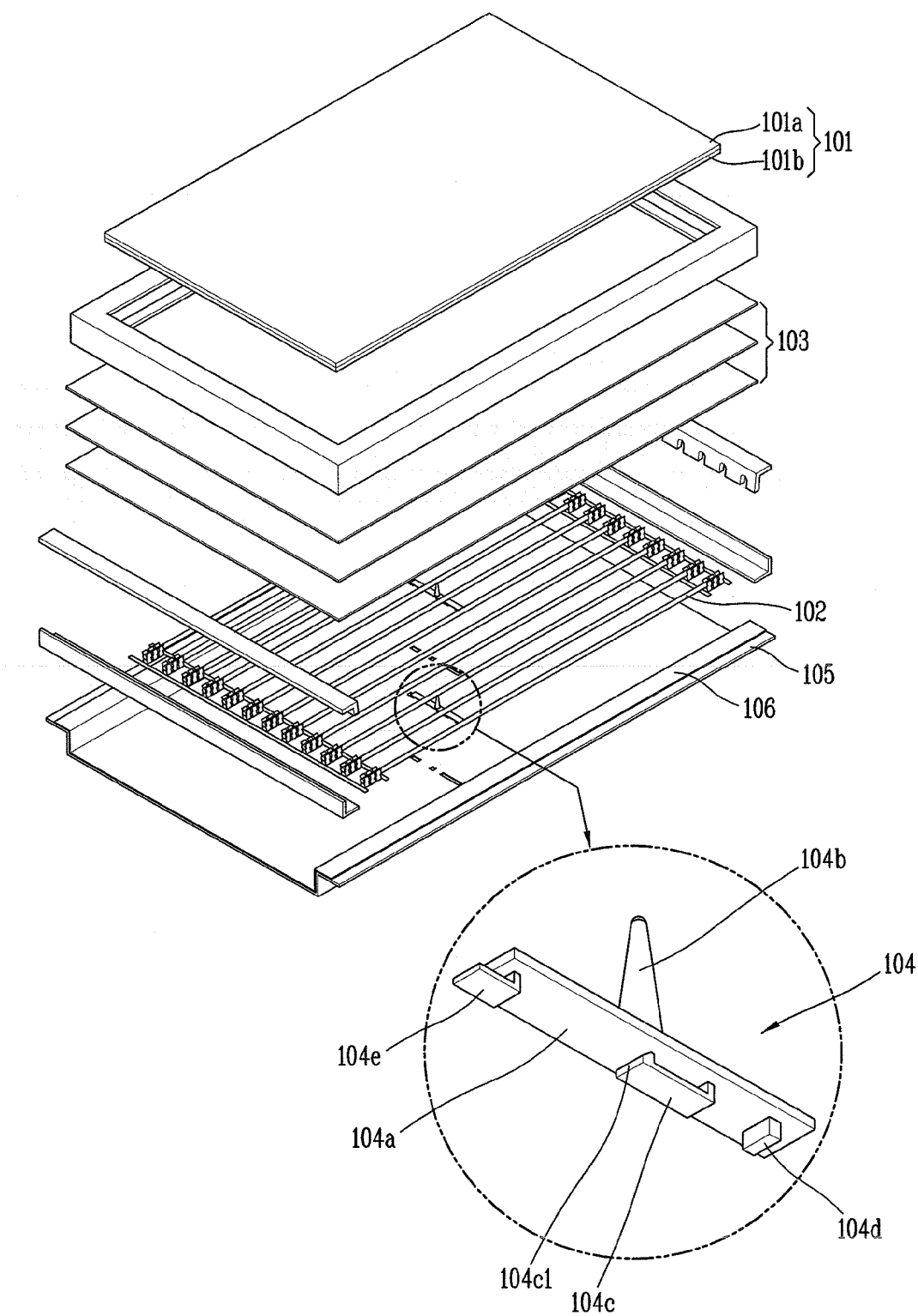
FIG. 4 is a perspective view showing an LCD device according to the present invention.
Figure 5:
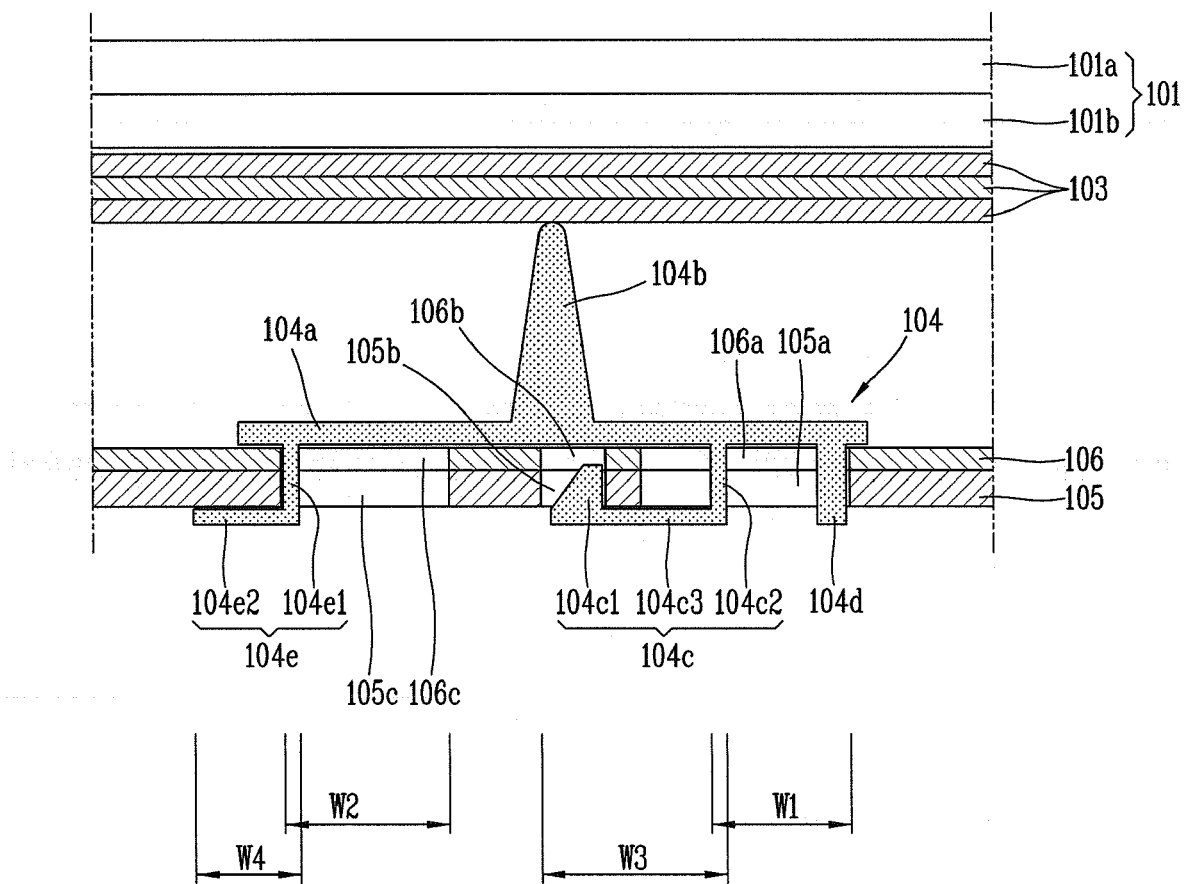
FIG. 5 is an enlarged sectional view showing an area where an optical sheet supporting means is provided in an LCD device according to the present invention.

As shown in FIGS. 4 and 5, an LCD device according to the present invention comprises: an LC panel 101; a light source 102 for supplying light to the LC panel 101; an optical sheet 103 for converting light from the light source 102 and supplying the converted light to the LC panel 101; an optical sheet supporting means 104 including a bar-shaped body portion 104a, a supporting portion 104b upwardly protruding from the body portion 104a and supporting the optical sheet 103, a first fixing portion 104c downwardly protruding from the body portion 104a, formed in a single bending process, and having a first stopper 104c1 at the end thereof, and a second stopper 104d downwardly protruding from the body portion 104a; and a lower cover 105 having a first coupling hole 105a to couple a part of the first fixing portion 104c and the second stopper 104d, and having a second coupling hole 105b to couple the first stopper 104c1 of the first fixing portion 104c, for accommodating the light source 102 and the optical sheet supporting means 104 therein.

A second fixing portion 104e downwardly protruding from the body portion 104a and formed in a single bending process may be further formed at the optical sheet supporting means 104. A fifth coupling hole 105c corresponding to the second fixing portion 104e is formed at the lower cover 105.

A reflection sheet 106 for reflecting light emitted from the light source 102 toward the LC panel 101 may be further provided in the lower cover 105. A third coupling hole 106a corresponding to the first coupling hole 105a of the lower cover 105, a fourth coupling hole 106b corresponding to the second coupling hole 105b, and a sixth coupling hole 106c corresponding to the fifth coupling hole 105c are formed at the reflection sheet 106.

Each component of the LCD device according to the present invention will be explained in more detail.

Referring to FIGS. 4 and 5, the LC panel 101 is composed of an upper substrate, a color filter substrate 101a, and a lower substrate, a thin film transistor (TFT) array substrate 101b. Although not shown, an LC layer is interposed between the two substrates.

The light source 102 is disposed in plurality in number below the LC panel 101, thereby supplying light to the LC panel 101.

In the present invention, as the light source 102, an external electrode fluorescent lamp was used. However, the light source 102 is not limited thereto, but may include various light sources such as a cold cathode fluorescent lamp (CCFL) or a light emitting diode (LED).

Above the light source 102, disposed is the optical sheet 103 for enhancing optical efficiency by converting light emitted from the light source 102 and supplying the converted light to the LC panel 101. The optical sheet 103 includes a plurality of sheets such as a diffusion sheet, a prism sheet, and a protection sheet.

Below the optical sheet 103, disposed is the optical sheet supporting means 104 having the supporting portion 104b for preventing the optical sheet 103 that becomes larger according to a recent trend that an LCD device becomes larger, from being downwardly deformed due to its weight.

Referring to FIGS. 4 and 5, the optical sheet supporting means 104 includes a bar-shaped body portion 104a having one surface contacting the lower cover 105 or the reflection sheet 106; a supporting portion 104b upwardly protruding from the body portion 104a and contacting a lowest surface of the optical sheet 103, that is, a rear surface of a diffusion sheet; a first fixing portion 104c downwardly protruding from the body portion 104a, formed in a single bending process, and having a first stopper 104c1 at the end thereof; and a second stopper 104d downwardly protruding from the body portion 104a.

Referring to FIG. 5, the first fixing portion 104c of the optical sheet supporting means 104 includes a first region 104c2 downwardly protruding from the body portion 104a; a second region 104c3 bent from the first region 104c2, and formed to be parallel to the body portion 104a; and a first stopper 104c1 upwardly protruding from the end of the second region 104c3.

The second fixing portion 104e of the optical sheet supporting means 104 includes a first region 104e1 downwardly protruding from the body portion 104a; and a second region 104e2 bent from the first region 104e1, and formed to be parallel to the body portion 104a.

Referring to FIG. 5, the second stopper 104d is disposed to face the first stopper 104c1 based on the first region 104c2 and the second region 104c3 of the first fixing portion 104c, and is disposed to face the second fixing portion 104e based on the first fixing portion 104c.

In the optical sheet supporting means 104, the first region 104c2 of the first fixing portion 104c, and the second stopper 104d are coupled to the first coupling hole 105a of the lower cover 105. The first stopper 104c1 of the first fixing portion 104c is coupled to the second coupling hole 105b of the lower cover 105. And, the first region 104e1 of the second fixing portion 104e is coupled to the fifth coupling hole 105c.

According to these configurations, the optical sheet supporting means 104 is fixed to the lower cover 105 in right and left directions, and back and forth directions.

More specifically, the first region 104e1 of the second fixing portion 104e of the optical sheet supporting means 104 is coupled to the fifth coupling hole 105c, thereby fixing the optical sheet supporting means 104 to the left side in FIG. 5. And, the first stopper 104c1 and the second stopper 104d are coupled to the first coupling hole 105a and the second coupling hole 105b, respectively, thereby fixing the optical sheet supporting means 104 to the right side in FIG. 5. These configurations will be explained in more detail with respect to the following lower cover 105

The second region 104c3 of the first fixing portion 104c of the optical sheet supporting means 104, and the second region 104e2 of the second fixing portion 104e are disposed below the lower cover 105, that is, outside the lower cover 105.

Accordingly, a space formed by the second region 104c3 of the first fixing portion 104c of the optical sheet supporting means 104, and the body portion 104a, and a space formed by the second region 104e2 of the second fixing portion 104e, and the body portion 104a are coupled to the lower cover 105. As a result, the optical sheet supporting means 104 is fixed to the lower cover 105 in upper and lower directions in FIG. 5.

In FIGS. 4 and 5, the supporting portion 104b of the optical sheet supporting means 104 is formed in a conical shape having an upper region of a smoothly curved surface so as to prevent damage of the optical sheet 103. However, the supporting portion 104b is not limited thereto, but may be formed in a triangular pyramid shape to prevent the optical sheet 103 from being downwardly deformed.

Preferably, the optical sheet supporting means 104 is formed of a molding material such as resin for elasticity and flexibility. Accordingly, a part of the optical sheet supporting means 104 can be bent, thereby facilitating to couple the optical sheet supporting means 104 to the lower cover.

When the light source 102 of the LCD device is implemented as an external electrode fluorescent lamp or a cold cathode fluorescent lamp, a lamp holder (not shown) for preventing the fluorescent lamp that becomes larger according to a recent trend that the LCD device becomes larger, from being deformed due to its weight, and from moving may be further provided at the optical sheet supporting means 104.

Although not shown, the lamp holder is formed to be upwardly protruding from the body portion 104a of the optical sheet supporting means 104, and is formed to cover a part of an outer surface of the fluorescent lamp.

Referring to FIGS. 4 and 5, as aforementioned, the lower cover 105 includes the first coupling hole 105a to couple the first region 104c2 of the first fixing portion 104c and the second stopper 104d, the second coupling hole 105b to couple the first stopper 104c1 of the first fixing portion 104c, and the fifth coupling hole 105c to couple the first region 104e1 of the second fixing portion 104e.

Referring to FIG. 5, the first coupling hole 105a has a width (W1) equal to or larger than a width (W3) of the first fixing portion 104c of the optical sheet supporting means 104. Here, the width (W1) of the first coupling hole 105a is equal to or larger than the sum among a width of the first region 104c2 of the first fixing portion 104c, a gap between the first region 104c2 of the first fixing portion 104c and the second stopper 104d, and a width of the second stopper 104d. The reasons are in order to position the second region 104c3 of the first fixing portion 104c below the lower cover 105, to couple the first stopper 104c1 of the first fixing portion 104c to the second coupling hole 105b, and to couple the second stopper 104e to the first coupling hole 105a, by sliding the optical sheet supporting means 104 after the first fixing portion 104c of the optical sheet supporting means 104 is entirely coupled to the first coupling hole 105a of the lower cover 105 when manufacturing the LCD device.

Preferably, the second coupling hole 104e has the same width as the first stopper 104c1 so as to couple the first stopper 104c1 of the first fixing portion 104c.

Preferably, the fifth coupling hole 105c has a width (W2) equal to or larger than a width (W4) of the second fixing portion 104e of the optical sheet supporting means 104. The reason is in order to position the second region 104e2 of the second fixing portion 104e below the lower cover 105, by sliding the optical sheet supporting means 104 after the second fixing portion 104e of the optical sheet supporting means 104 is entirely coupled to the fifth coupling hole 105c of the lower cover 105.

As the first fixing portion 104c, the second fixing portion 104e, and the second stopper 104d of the optical sheet supporting means 104 are coupled to the first coupling hole 105a, the second coupling hole 105b, and the fifth coupling hole 105c of the lower cover 105, respectively, the optical sheet supporting means 104 is fixed onto the lower cover 105 in various directions.

More concretely, when coupled to the lower cover 105, the optical sheet supporting means 104 is fixed onto the lower cover 105 in upper and lower directions, right and left directions, and back and forth directions. Especially, the first region 104c2 of the first fixing portion 104c serves to fix the optical sheet supporting means 104 in the left direction of FIG. 5, and the first stopper 104c1 of the first fixing portion 104c serves to fix the optical sheet supporting means 104 in the right direction of FIG. 5. Also, the first region 104e1 of the second fixing portion 104e serves to fix the optical sheet supporting means 104 in the left direction of FIG. 5, and the second stopper 104d serves to fix the optical sheet supporting means 104 in the right direction of FIG. 5.

The optical sheet supporting means 104 is fixed to the lower cover 105 in the left direction of FIG. 5 by the first region 104c2 of the first fixing portion 104c, and the first region 104e1 of the second fixing portion 104e, and is fixed in the right direction of FIG. 5 by the first stopper 104c1 and the second stopper 104d. Accordingly, when an external force is applied to the optical sheet supporting means 104, the first stopper 104c1 is prevented from being detached from the second coupling hole 105b of the lower cover 105.

The first region 104c2 of the first fixing portion 104c, the first stopper 104c1, the second stopper 104d, and the first region 104e1 of the second fixing portion 104e serve to fix the optical sheet supporting means 104 to the lower cover 105 in front and rear directions of FIG. 5.

In the LCD device according to the present invention, a reflection means to enhance optical efficiency by reflecting light emitted from the light source 102 and passing in a reverse direction to the LC panel 101, toward the LC panel 101 is provided inside the lower cover 105. The reflection means may be implemented as an inner surface of the lower cover 105 is formed to have a reflection characteristic, or an additional sheet having a reflection characteristic is disposed inside the lower cover 105.

In the preferred embodiment of the present invention, the reflection means is implemented as the reflection sheet 106.

Referring to FIGS. 4 and 5, the third coupling hole 106a corresponding to the first coupling hole 105a of the lower cover 105, the fourth coupling hole 106b corresponding to the second coupling hole 105b, and the sixth coupling hole 106c corresponding to the fifth coupling hole 105c are formed at the reflection sheet 106. Preferably, the third coupling hole 106a, the fourth coupling hole 106b, and the sixth coupling hole 106c are formed to have the same size as the fifth coupling hole 105a, the second coupling hole 105b, and the fifth coupling hole 105c, respectively.

The third coupling hole 106a serves to couple the first region 104c2 of the first fixing portion 104c of the optical sheet supporting means 104, and the second stopper 104d. The fourth coupling hole 106b serves to couple the first stopper 104c1 of the first fixing portion 104c of the optical sheet supporting means 104. And, the sixth coupling hole 106c serves to couple the first region 104e1 of the second fixing portion 104e of the optical sheet supporting means 104.

When the second stopper 104d of the optical sheet supporting means 104 has a thickness equal to or smaller than that of the lower cover 105, the second stopper 104d may be coupled only to the second coupling hole 105b of the lower cover 105, but may not be coupled to the fourth coupling hole 106b of the reflection sheet 106. However, in the preferred embodiment of the present invention, the thickness of the second stopper 104d of the optical sheet supporting means 104 is set to be larger than the thickness of the lower cover 105.

Figure 6A:
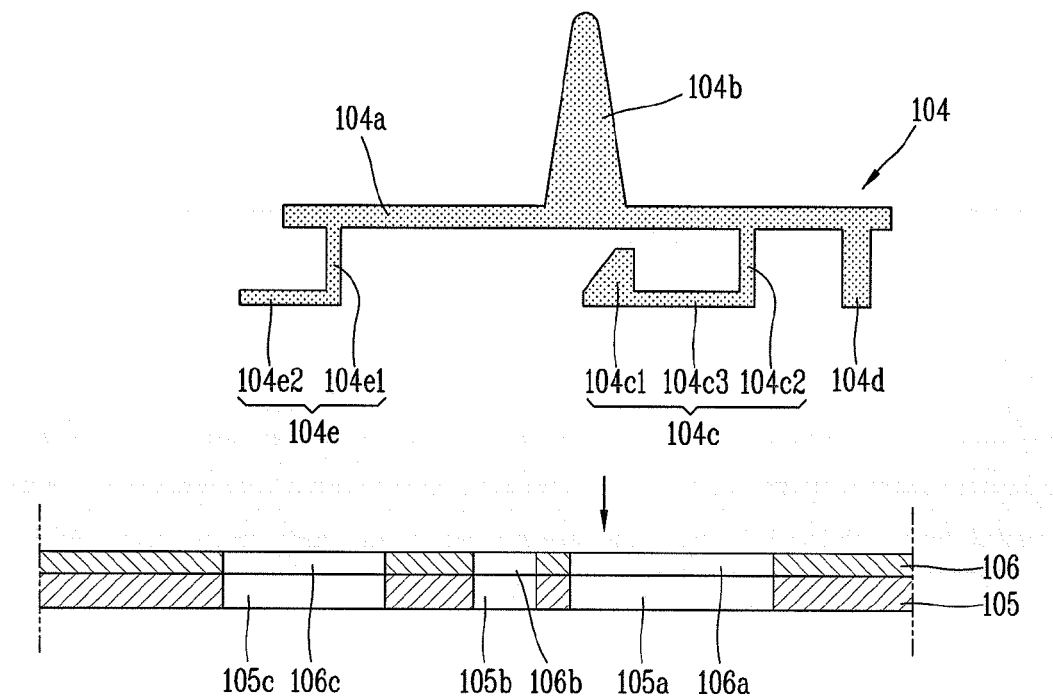
FIGS. 6A to 6C are sectional views showing processes for coupling an optical sheet supporting means to a lower cover and a reflection sheet according to the present invention.
Figure 6B:
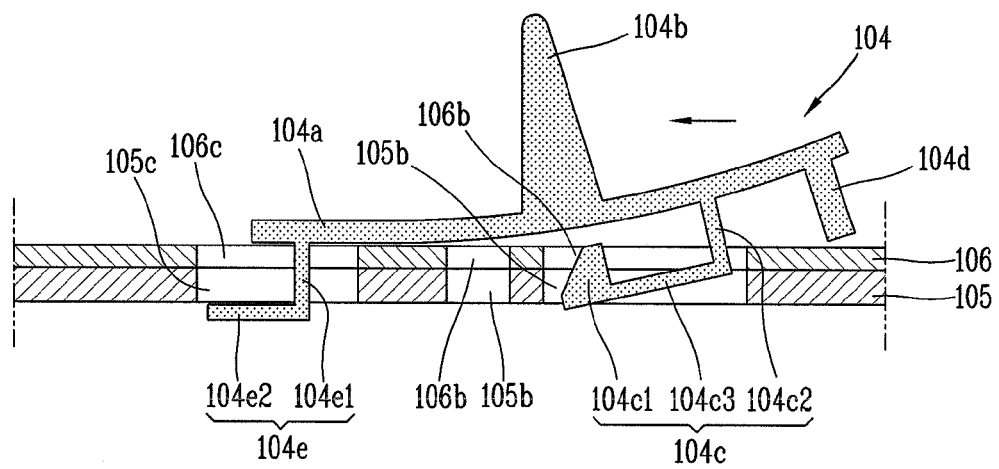
Figure 6C:
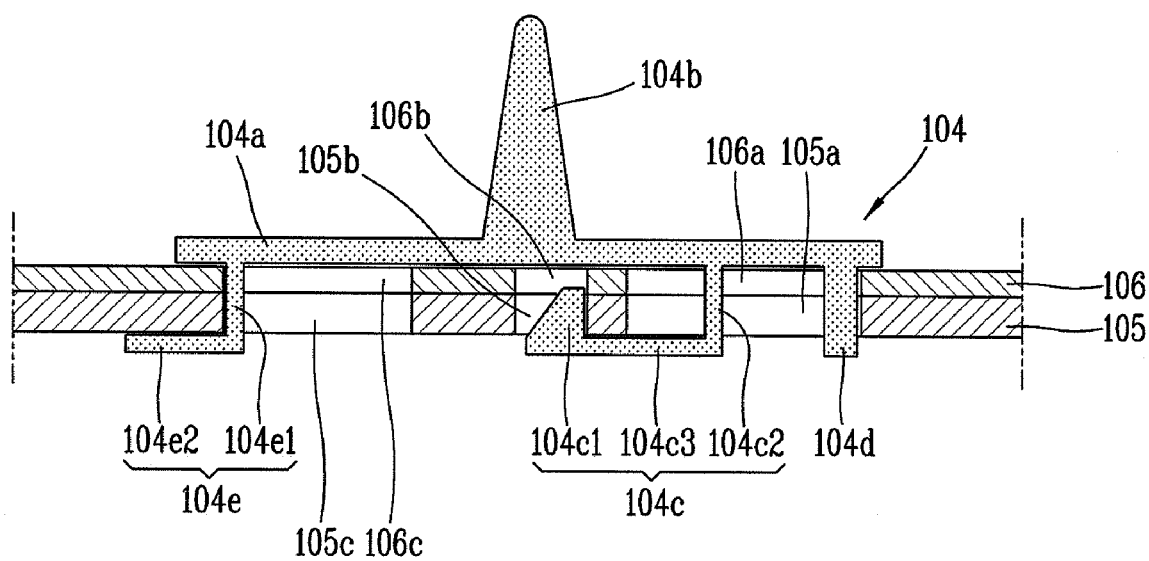

Referring to FIGS. 6A to 6C, will be explained processes to couple the optical sheet supporting means 104 to the lower cover 105 and the reflection sheet 106.

As shown in FIG. 6A, the optical sheet supporting means 104 is disposed inside the lower cover 105 having the reflection sheet 106 accommodated therein, so that the first fixing portion 104c of the optical sheet supporting means 104 can correspond to an upper side of the first coupling hole 105a of the lower cover 105, and the third coupling hole 106a of the reflection sheet 106, and so that the second fixing portion 106e can correspond to an upper side of the fifth coupling hole 105c of the lower cover 105, and the sixth coupling hole 106c of the reflection sheet 106.

Then, the optical sheet supporting means 104 is moved to a direction indicated by the arrow in FIG. 6A, thereby disposing the first fixing portion 104c of the optical sheet supporting means 104 in the first coupling hole 105a of the lower cover 105 and the third coupling hole 106a of the reflection sheet 106, and disposing the second fixing portion 106e in the fifth coupling hole 105c of the lower cover 105 and the sixth coupling hole 106c of the reflection sheet 106.

Then, while the optical sheet supporting means 104 is pressurized in a direction indicated by the arrow of FIG. 6A, the optical sheet supporting means 104 is made to be slid in a direction indicated by the arrow of FIG. 6B.

The optical sheet supporting means 104 is formed of a molding material such as resin for elasticity and flexibility. Accordingly, when the optical sheet supporting means 104 is pressurized to perform a sliding motion, the second stopper 104d, and the first fixing portion 104c protruding from the body portion 104a of the optical sheet supporting means 104 are bent by the pressure. Here, once the first stopper 104c1 of the first fixing portion 104c is coupled to the second coupling hole 105b of the lower cover 105, and the fourth coupling hole 106b of the reflection sheet 106, the second stopper 106d is coupled to the first coupling hole 105a of the lower cover 105, and the third coupling hole 106a of the reflection sheet 106. Accordingly, the processes to couple the optical sheet supporting means 105 to the lower cover 105 and the reflection sheet 106 are completed.

When the second stopper 104d of the optical sheet supporting means 104 has a thickness equal to or smaller than that of the lower cover 105, the second stopper 104d may be coupled only to the second coupling hole 105b of the lower cover 105, but may not be coupled to the fourth coupling hole 106b of the reflection sheet 106.

However, in the preferred embodiment of the present invention, the optical sheet supporting means 104 is provided with the second stopper 104d individually from the first fixing portion 104c and the second fixing portion 104e. Accordingly, the optical sheet supporting means 104 is double-fixed to the lower cover 105 in the right direction of FIGS. 5 and 6C by the first stopper 104c1 of the first fixing portion 104c and the second stopper 104d. As a result, when an external force is applied to the optical sheet supporting means 104, the first stopper 104c1 of the first fixing portion 104c is prevented from being detached from the second coupling hole 105b of the lower cover 105. This enables for the optical sheet supporting means 104 to stably support the optical sheet 103, and enhances a picture quality on the LC panel 101.

The foregoing embodiments and advantages are merely exemplary and are not to be construed as limiting the present invention The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A liquid crystal display (LCD) device, comprising:
an LC panel;
a light source for supplying light to the LC panel;
an optical sheet for converting light from the light source and supplying the converted light to the LC panel;
an optical sheet supporting means including a bar-shaped body portion, a supporting portion upwardly protruding from the body portion and supporting the optical sheet, a first fixing portion downwardly protruding from the body portion which is bent twice and has a first stopper at the end thereof, a second stopper downwardly protruding from the body portion, and a second fixing portion downwardly protruding from the body portion which is bent once; and
a lower cover having a first coupling hole to couple a part of the first fixing portion and the second stopper, and having a second coupling hole to couple the first stopper of the first fixing portion, for accommodating the light source and the optical sheet supporting means therein, and a fifth coupling hole to couple the second fixing portion,
wherein the first stopper is formed in a flat rectangular shape, and the second stopper is formed in a flat rectangular shape and penetrates the lower cover through the second first coupling hole,
wherein the first stopper is contacted with a side wall within the second coupling hole in a first contact direction, the second stopper is contacted with a side wall within the first coupling hole in a second contact direction, and the second fixing portion is contacted with a side wall within the fifth coupling hole in a third contact direction, and wherein the first contact direction is the same as the second contact direction and is opposite to the third contact direction.

2. The LCD device of claim 1, wherein the first fixing portion of the optical sheet supporting means comprises:
- a first region downwardly protruding from the body portion;
- a second region bent from the first region, and formed to be parallel to the body portion; and
- the first stopper upwardly protruding from an end of the second region,
- wherein the first coupling hole of the lower cover couples the first region of the first fixing portion, and the second stopper, and
- wherein the second coupling hole serves to the first stopper of the first fixing portion.

3. The LCD device of claim 2, wherein the first coupling hole has a width equal to or larger than a width of the first fixing portion of the optical sheet supporting means, and
- wherein the width of the first coupling hole is equal to the sum among a width of the first region of the first fixing portion, a gap between the first region of the first fixing portion and the second stopper, and a width of the second stopper.

4. The LCD device of claim 2, wherein the second stopper is formed at an opposite side to the first stopper based on the first and second regions of the first fixing portion.

5. The LCD device of claim 1, further comprising a reflection sheet for reflecting light emitted from the light source toward the LC panel in the lower cover,
- wherein a third coupling hole corresponding to the first coupling hole of the lower cover, and a fourth coupling hole corresponding to the second coupling hole are formed at the reflection sheet.

6. The LCD device of claim 1, further comprising a reflection sheet for reflecting light emitted from the light source toward the LC panel in the lower cover, and
- wherein a sixth coupling hole corresponding to the fifth coupling hole is formed at the reflection sheet.

7. The LCD device of claim 1, wherein the second stopper is formed at an opposite side to the second fixing portion based on the first fixing portion.

* * * * *